(12) United States Patent
Tseng

(10) Patent No.: US 7,394,715 B1
(45) Date of Patent: Jul. 1, 2008

(54) MEMORY SYSTEM COMPRISING MEMORIES WITH DIFFERENT CAPACITIES AND STORING AND READING METHOD THEREOF

(75) Inventor: Jui-Hsing Tseng, Hsin-Chu Hsien (TW)

(73) Assignee: MediaTek Inc., Hsin-Chu Hsien (TW)

( * ) Notice: Subject to any disclaimer, the term of this patent is extended or adjusted under 35 U.S.C. 154(b) by 248 days.

(21) Appl. No.: 11/306,771

(22) Filed: Jan. 11, 2006

(51) Int. Cl.
 *G11C 8/00* (2006.01)
(52) U.S. Cl. .......... 365/230.03; 365/221; 365/189.011; 717/179
(58) Field of Classification Search ............ 365/230.03, 365/221, 189.01, 189.011; 711/179
See application file for complete search history.

(56) References Cited

U.S. PATENT DOCUMENTS 4,630,230 A * 12/1986 Sundet ....................... 711/169
7,013,362 B1 * 3/2006 Ervin ............................ 711/2

* cited by examiner

*Primary Examiner*—Son Dinh
*Assistant Examiner*—Nam Nguyen
(74) *Attorney, Agent, or Firm*—Winston Hsu

(57) ABSTRACT

A memory system includes a first memory, a second memory, a determining unit, and an accessing unit. The capacity of the second memory is different from the capacity of the first memory. The first and the second memories are virtually partitioned into a first section and a second section. The determining unit determines to which of the first and the second sections an address corresponds, the address being associated with data to be transferred. The accessing unit is coupled to the determining unit and the first and second memories for transferring the data to or from the first memory and a first portion of the second memory when the determining unit determines that the address corresponds to the first section; and for transferring the data to or from a second portion of the second memory when the determining unit determines that the address corresponds to the second section.

16 Claims, 4 Drawing Sheets

MEMORY SYSTEM COMPRISING MEMORIES WITH DIFFERENT CAPACITIES AND STORING AND READING METHOD THEREOF

BACKGROUND

This disclosure relates to a memory system, and more particularly, to a memory system comprising memories with different capacities and storing and reading method thereof.

A memory is an essential component of many kinds of electronic devices. In the early days, memories were independently soldered onto an electronic device's main board, or independently plugged into sockets that were soldered onto the main board. This scheme worked fine since electronic devices in the early days did not require much memory space. However, as the requirements of memory space and memory bandwidth increased, the number of memories demanding space on a main board of an electronic device was also increased. To deal with this problem, an idea of integrating a plurality of memories and supporting components into a single apparatus, which is referred to as a memory system, had been proposed.

In a memory system of the related art, memories with equal capacity must be used. FIG. 1 shows a block diagram of a conventional memory system 100. The memory system 100 includes a memory controller 110, a first memory 120, and a second memory 130. The capacity of the first memory 120 is equal to the capacity of the second memory 130. Both the first memory 120 and the second memory 130 have a data bus width of N and a control and address bus width of M. As for the memory controller 110, since the data buses of the two memories are shunted and the control and address buses of the two memories are shared, the memory controller 110 has a data bus width of 2N and a control and address bus width of M.

Since memories with equal capacity must be used in a memory system, the total capacity of a memory system of the related art does not have flexibility. For example, if a 48 megabytes (MB) capacity is required, it is not allowed to assemble a first memory of 16 MB capacity with a second memory of 32 MB capacity to build a memory system. Instead, two memories each of 32 MB capacity must be used to build the memory system, even though the excess 16 MB of memory space is not required. The cost of the whole memory system is therefore increased.

SUMMARY

It is an objective of one of the embodiments to provide a memory system comprising memories with different capacities, and a reading and storing method thereof.

An exemplary embodiment of a memory system comprises a first memory, a second memory, a determining unit, and an accessing unit. The capacity of the second memory is different from the capacity of the first memory; the first and the second memories are virtually partitioned into a first section and a second section. The determining unit determines to which of the first and the second sections an address corresponds, the address being associated with data to be transferred. The accessing unit is coupled to the determining unit, the first memory, and the second memory for transferring the data to or from the first memory and a first portion of the second memory when the determining unit determines that the address corresponds to the first section. The accessing unit further transfers the data to or from a second portion of the second memory when the determining unit determines that the address corresponds to the second section.

A memory system comprises a first section and a second section. The first section comprises a first memory and a first portion of a second memory; the second section comprises a second portion of the second memory. An exemplary embodiment of a storing method for the memory system comprises: receiving data and an address associated therewith; determining to which of the first and the second sections the address corresponds; if the address corresponds to the first section, storing the data into the first section; and if the address corresponds to the second section, storing the data into the second section.

A memory system comprises a first section and a second section. The first section comprises a first memory and a first portion of a second memory; the second section comprises a second portion of the second memory. An exemplary embodiment of a reading method for the memory system comprises: receiving an address; determining to which of the first and the second sections the address corresponds; if the address corresponds to the first section, reading data from the first section; and if the address corresponds to the second section, reading data from the second section.

DETAILED DESCRIPTION

Figure 1:
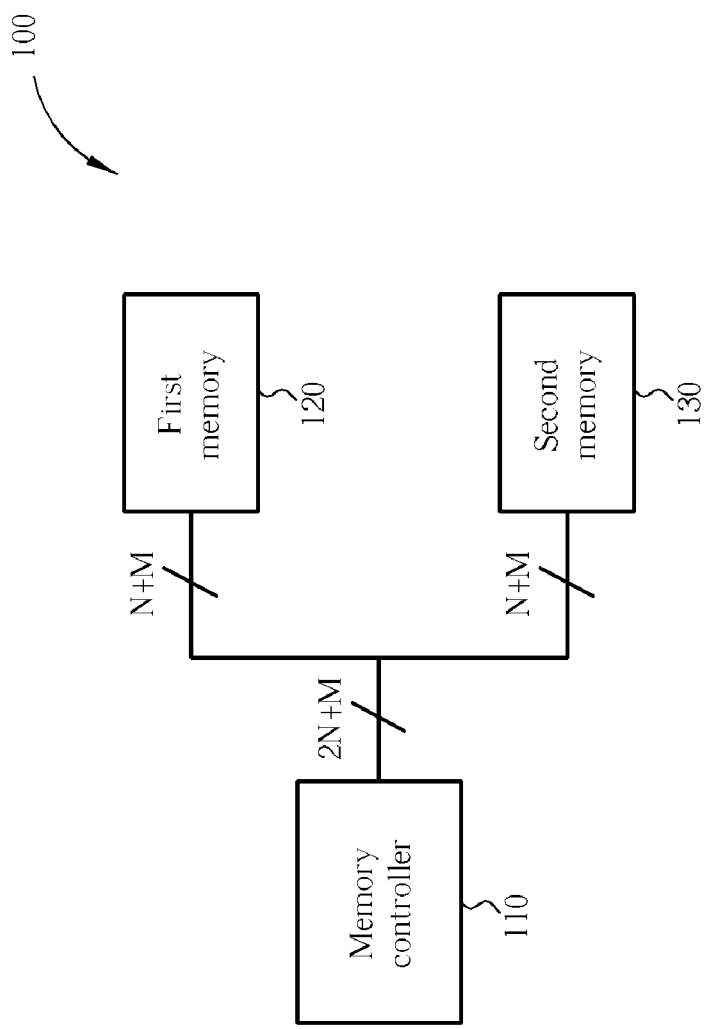
FIG. 1 shows a block diagram of a conventional memory system.
Figure 2:
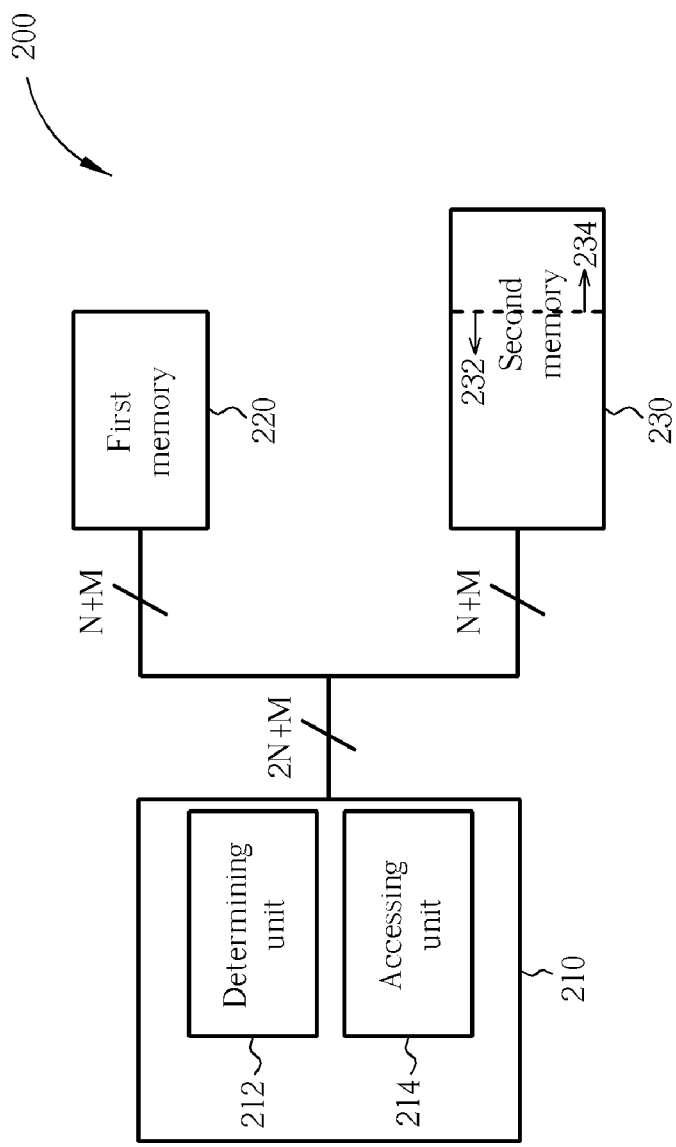
FIG. 2 shows a block diagram of a memory system according to an exemplary embodiment.

FIG. 2 shows a block diagram of a memory system 200 according to an exemplary embodiment. In this exemplary embodiment, the memory system 200 includes a memory controller 210, a first memory 220, and a second memory 230. Each of the first and the second memories 220-230 can be an independent memory chip, such as an independent volatile memory chip. The capacity of the second memory 230 is different from the capacity of the first memory 220. The first and the second memories 220 and 230 are virtually partitioned into a first section and a second section. The first section comprises the first memory 220 and a first portion 232 of the second memory 230. The second section comprises a second portion 234 of the second memory 230. For one example, assuming that both the first memory 220 and the first portion 232 of the second memory 230 have capacity of X, and the second portion 234 of the second memory 230 has capacity of Y. The first section can be a low address section between 0 and 2X−1, and the second section can be a high address section between 2x and 2X+Y−1. The first section can also be a high address section between Y and 2X+Y−1, and the second section can be a low address section between 0 and Y−1.

In this exemplary embodiment, both the first memory 220 and the second memory 230 have a data bus width of N and a control and address bus width of M. From the point view of the memory controller 210, the data buses of the two memories are shunted and the control and address buses of the two memories are shared, hence the memory controller 210 has a data bus width of 2N and a control and address bus width of M.

The memory controller 210 of this exemplary embodiment comprises a determining unit 212 and an accessing unit 214. The determining unit 212 determines to which of the first and the second sections an address corresponds, the address is associated with data to be transferred. The accessing unit 214 transfers the data according to a determining result of the determining unit 210.

For storing operations, the address examined by the determining unit 212 is associated with data to be stored. The data to be stored is virtually partitioned into a first part and a second part. When the determining unit 212 determines that the address corresponds to the first section, the accessing unit 214 simultaneously stores the first part of the data into the first memory 220 and stores the second part of the data into the first portion 232 of the second memory 230. When the determining unit 212 determines that the address corresponds to the second section, the accessing unit 214 sequentially stores the first part and the second part of the data into the second portion 234 of the second memory 230.

Figure 3:
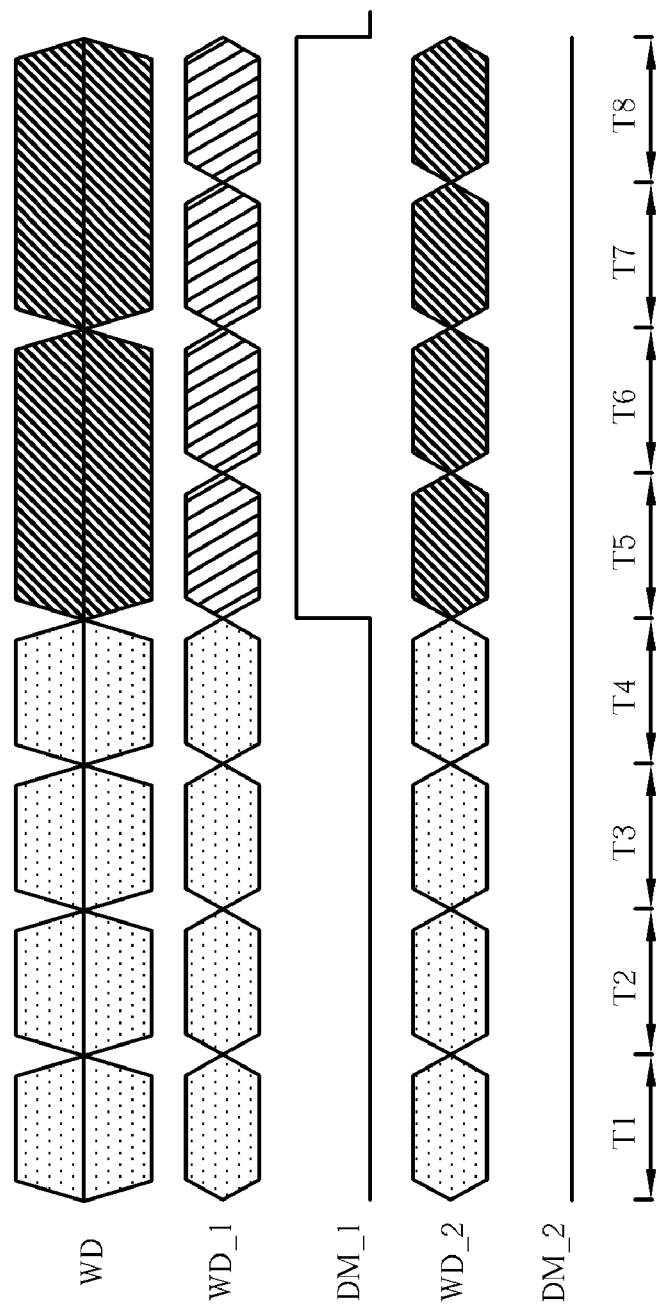
FIG. 3 shows a timing diagram illustrating how data are stored by the memory system of FIG. 2.

FIG. 3 shows a timing diagram of an exemplary embodiment illustrating how data are stored by the memory system 210. The horizontal axes listed from top to bottom correspond to a write signal WD, a first memory write signal WD_1, a first memory control signal DM_1, a second memory write signal WD_2, and a second memory control signal DM_2. During the four clock cycles T1-T4, addresses corresponding to the first section and associated data are received. In each of these four clock cycles T1-T4, a first part of a received data is stored into the first memory 220 and a second part of the received data is stored into the first portion 232 of the second memory 230 simultaneously. During the four clock cycles T5-T8, addresses corresponding to the second section and associated data are received. For each data to be stored, a first part and a second part of the data are sequentially stored into the second portion 234 of the second memory 230 in two consecutive clock cycles. Please note that the first memory control signal DM_1 provided to the first memory 220 is utilized as a data mask signal to prevent the data from being stored into the first section mistakenly during the four clock cycles T5-T8, when the determining unit 212 determines that the address corresponds to the second section.

For reading operations, the address examined by the determining unit 212 is associated with data to be read. Each data to be read comprises a first part and a second part. When the determining unit 212 determines that the address corresponds to the first section, the accessing unit 214 simultaneously reads the first part of the data from the first memory 220 and reads the second part of the data from the first portion 232 of the second memory 230. When the determining unit 212 determines that the address corresponds to the second section, the accessing unit 214 sequentially reads the first part and the second part of the data from the second portion 234 of the second memory 230 in two consecutive clock cycles.

Figure 4:
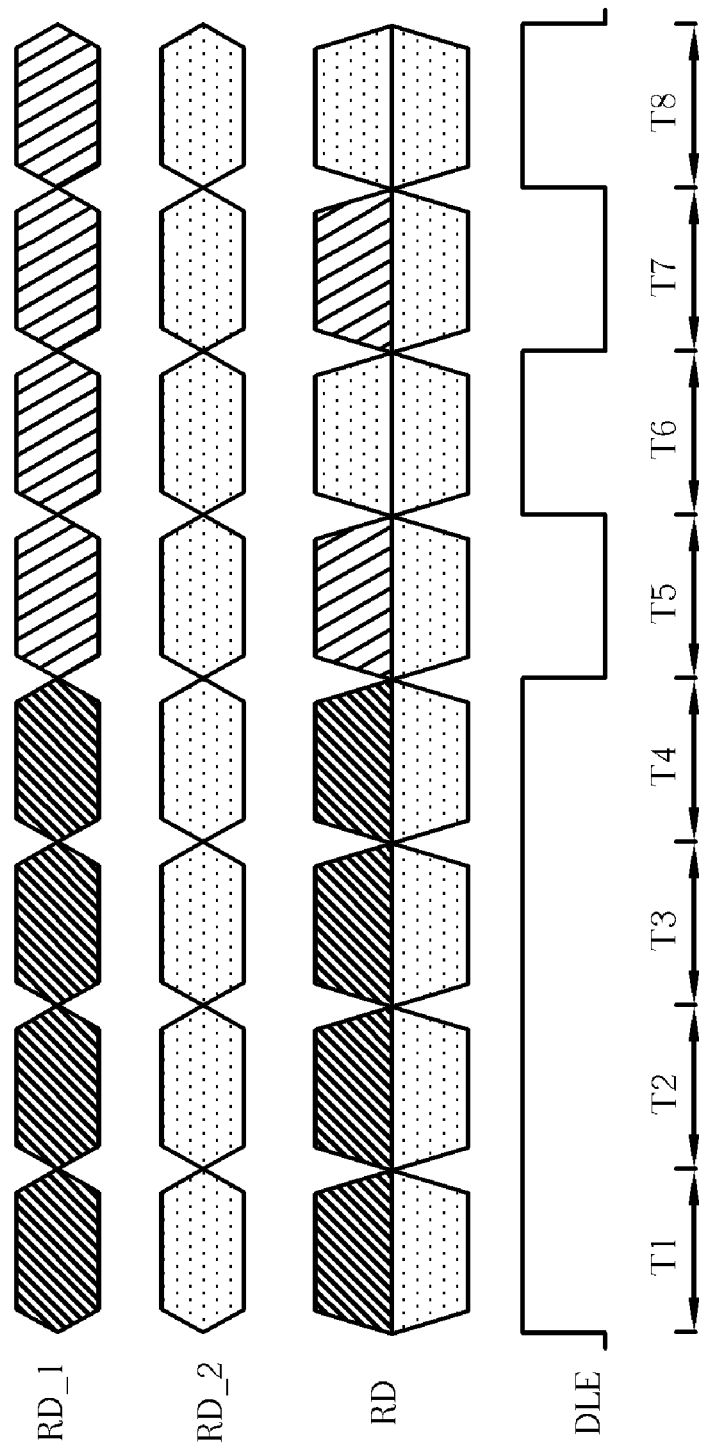
FIG. 4 shows a timing diagram illustrating how data are read from the memory system of FIG. 2.

FIG. 4 shows a timing diagram of an exemplary embodiment illustrating how data are read from the memory system 200. The horizontal axes listed from top to bottom correspond to a first memory read signal RD_1, a second memory read signal RD_2, a read signal RD, and a control signal DLE. During the four clock cycles T1-T4, addresses corresponding to the first section are received. In each of these clock cycles, a first part of a data is read from the first memory 220 and a second part of the data is read from the first portion 232 of the second memory 230 simultaneously. During the four clock cycles T5-T8, addresses corresponding to the second section are received. For each data to be read, a first part and a second part of the data are sequentially read from the second portion 234 of the second memory 230 in two consecutive clock cycles. To prevent the data from being generated mistakenly, the control signal DLE is utilized to latch the first part of each data until the data is completely read from the second section during the clock cycles T5-T6 and T7-T8.

With the concepts provided by the embodiments, memories with different capacities can be utilized to build a memory system. Therefore the total capacity of the memory system can be more flexible, and less memory space will be unnecessarily wasted.

Those skilled in the art will readily observe that numerous modifications and alterations of the device and method may be made while retaining the teachings of the embodiments. Accordingly, the above disclosure should be construed as limited only by the metes and bounds of the appended claims.

What is claimed is:

1. A storing method for a memory system comprising a first section and a second section, the first section comprising a first memory and a first portion of a second memory, the second section comprising a second portion of the second memory, the first memory having a first data bus, the second memory having a second data bus different from the first data bus, the method comprising:
   receiving data and an address associated therewith;
   determining to which of the first and the second sections the address corresponds;
   if the address corresponds to the first section, storing the data into the first section; and
   if the address corresponds to the second section, storing the data into the second section.

2. The method of claim 1, wherein storing the data into the first section comprises:
   simultaneously storing a first part of the data into the first memory and storing a second part of the data into the first portion of the second memory.

3. The method of claim 1, wherein storing the data into the second section comprises:
   sequentially storing a first part and a second part of the data into the second portion of the second memory.

4. The method of claim 3, wherein storing the data into the second section further comprises:
   providing a control signal to prevent the data from being stored into the first section.

5. A reading method for a memory system comprising a first section and a second section, the first section comprising a first memory and a first portion of a second memory, the second section comprising a second portion of the second memory, the first memory having a first data bus, the second memory having a second data bus different from the first data bus, the method comprising:
   receiving an address;
   determining to which of the first and the second sections the address corresponds;
   if the address corresponds to the first section, reading data from the first section; and
   if the address corresponds to the second section, reading data from the second section.

6. The method of claim 5, wherein reading the data from the first section comprises:
   simultaneously reading a first part of the data from the first memory and reading a second part of the data from the first portion of the second memory.

7. The method of claim 5, wherein reading the data from the second section comprises:
   sequentially reading a first part and a second part of the data from the second portion of the second memory.

8. The method of claim 7, wherein reading the data from the second section further comprises:

providing a control signal to latch the first part of the data until the data is completely read from the second section.

9. A memory system comprising:

a first memory having a first data bus;

a second memory having a second data bus different from the first data bus, the capacity of the second memory being different from the capacity of the first memory, the first and the second memories being virtually partitioned into a first section and a second section;

a determining unit for determining to which of the first and the second sections an address corresponds, the address being associated with data to be transferred; and an accessing unit coupled to the determining unit, the first memory, and the second memory, for transferring the data to or from the first memory and a first portion of the second memory via the first and second data buses respectively when the determining unit determines that the address corresponds to the first section, and for transferring the data to or from a second portion of the second memory via the second data bus when the determining unit determines that the address corresponds to the second section.

10. The memory system of claim 9, wherein the accessing unit simultaneously stores a first part of the data into the first memory and stores a second part of the data into the first portion of the second memory when the determining unit determines that the address corresponds to the first section.

11. The memory system of claim 9, wherein the accessing unit sequentially stores a first part and a second part of the data into the second portion of the second memory when the determining unit determines that the address corresponds to the second section.

12. The memory system of claim 11, wherein when the determining unit determines that the address corresponds to the second section, the accessing unit provides a control signal to prevent the data from being stored into the first section.

13. The memory system of claim 9, wherein the accessing unit simultaneously reads a first part of the data from the first memory and reads a second part of the data from the first portion of the second memory when the determining unit determines that the address corresponds to the first section.

14. The memory system of claim 9, wherein the accessing unit sequentially reads a first part and a second part of the data from the second portion of the second memory when the determining unit determines that the address corresponds to the second section.

15. The memory system of claim 14, wherein when the determining unit determines that the address corresponds to the second section, the accessing unit provides a control signal to latch the first part of the data until the data is completely read from the second section.

16. The memory system of claim 9, wherein the first section comprises the first memory and the first portion of the second memory, and the second section comprises the second portion of the second memory.

* * * * *